US011363418B2

(12) United States Patent
Rydén et al.

(10) Patent No.: US 11,363,418 B2
(45) Date of Patent: *Jun. 14, 2022

(54) METHOD AND APPARATUS FOR HANDLING POSITIONING OF A TARGET DEVICE

(71) Applicant: Telefonaktiebolaget LM Ericsson (publ), Stockholm (SE)

(72) Inventors: Henrik Rydén, Solna (SE); Fredrik Gunnarsson, Linköping (SE); Sara Modarres Razavi, Linköping (SE); Ritesh Shreevastav, Upplands Väsby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 16/989,952

(22) Filed: Aug. 11, 2020

(65) Prior Publication Data

US 2021/0021965 A1 Jan. 21, 2021

Related U.S. Application Data

(63) Continuation of application No. 16/345,382, filed as application No. PCT/SE2019/050102 on Feb. 7, 2019, now Pat. No. 10,779,125.

(Continued)

(51) Int. Cl.
*H04W 4/33* (2018.01)
*H04W 4/029* (2018.01)
*H04W 4/021* (2018.01)

(52) U.S. Cl.
CPC .......... *H04W 4/029* (2018.02); *H04W 4/021* (2013.01); *H04W 4/33* (2018.02)

(58) Field of Classification Search
CPC combination set(s) only.
See application file for complete search history.

(56) References Cited

U.S. PATENT DOCUMENTS 9,258,727 B2 * 2/2016 Kim ...................... H04W 24/10
9,507,027 B2 * 11/2016 Edge ...................... G01S 19/25
(Continued)

FOREIGN PATENT DOCUMENTS

JP 5450832 B1 1/2014
JP 2018507596 A 3/2018
(Continued)

OTHER PUBLICATIONS

3GPP, "3rd Generation Partnership Project; Technical Specification Group Radio Access Network; Evolved Universal Terrestrial Radio Access (E-UTRA); LTE Positioning Protocol (LPP) (Release 14)", 3GPP TS 36.355 V14.6.0, Jun. 2018, pp. 1-171.
(Continued)

*Primary Examiner* — Julio R Perez
(74) *Attorney, Agent, or Firm* — Murphy, Bilak & Homiller, PLLC

(57) ABSTRACT

Embodiments herein relate to a method performed by a target device, for handling positioning of the target device. The target device determines one or more displacements of the target device in relation to a reference position based on measurements performed by at least one location source. The target device sends, to a network node, a report comprising the determined one or more displacements of the target device, and a reference time to which the reference position is associated. Embodiments herein further relate to a method performed by a network node, for handling positioning of the target device. The network node obtains, from the target device, a report comprising the determined one or more displacements of the target device in relation to a reference position, wherein the one or more displacements
(Continued)

have been determined based on measurements performed by at least one location source, and a reference time to which the reference position is associated. The network node determines an absolute position of the target device based on the obtained one or more displacements and the reference position associated to the reference time.

18 Claims, 6 Drawing Sheets

Related U.S. Application Data

(60) Provisional application No. 62/627,962, filed on Feb. 8, 2018.

(56) References Cited

U.S. PATENT DOCUMENTS

| | | | | |
|---|---|---|---|---|
| 9,848,402 | B2* | 12/2017 | Lian | H04W 64/00 |
| 10,045,380 | B2* | 8/2018 | Rune | H04W 74/0833 |
| 10,517,009 | B2* | 12/2019 | Zetterberg | H04W 56/001 |
| 10,779,125 | B2* | 9/2020 | Ryden | H04W 4/029 |
| 2013/0106655 | A1* | 5/2013 | Pujante Cuadrupani | G01S 19/03 342/357.73 |
| 2013/0307723 | A1* | 11/2013 | Garin | G01S 5/0284 342/357.29 |
| 2014/0067262 | A1 | 3/2014 | Iketani | |
| 2015/0045056 | A1 | 2/2015 | Kangas et al. | |
| 2015/0378002 | A1 | 12/2015 | Hughes et al. | |
| 2016/0066157 | A1 | 3/2016 | Noorshams et al. | |
| 2016/0234644 | A1 | 8/2016 | Belghoul et al. | |
| 2016/0309442 | A1* | 10/2016 | Lian | H04W 4/02 |
| 2016/0359217 | A1* | 12/2016 | Burdick | H01Q 1/1257 |
| 2017/0078847 | A1 | 3/2017 | Smith et al. | |
| 2017/0083924 | A1* | 3/2017 | Shah | G16H 50/20 |
| 2018/0206168 | A1* | 7/2018 | Jia | H04W 76/27 |
| 2019/0045384 | A1* | 2/2019 | Zetterberg | H04W 56/001 |
| 2019/0104431 | A1* | 4/2019 | Gunnarsson | H04L 5/0048 |
| 2019/0357293 | A1* | 11/2019 | Gunnarsson | H04W 76/19 |
| 2020/0033849 | A1 | 1/2020 | Yiu et al. | |
| 2020/0068462 | A1* | 2/2020 | Zetterberg | H04W 36/0058 |
| 2020/0120447 | A1* | 4/2020 | Ryden | H04W 64/006 |
| 2020/0120479 | A1* | 4/2020 | Ryden | H04W 64/00 |
| 2020/0322915 | A1* | 10/2020 | Zhang | G01S 19/04 |

FOREIGN PATENT DOCUMENTS

| | | |
|---|---|---|
| RU | 2467518 C2 | 11/2012 |
| RU | 2513551 C2 | 4/2014 |
| WO | 2016126847 A1 | 8/2016 |
| WO | 2019032010 A1 | 2/2019 |

OTHER PUBLICATIONS

3GPP, "3rd Generation Partnership Project; Technical Specification Group Radio Access Network; Evolved Universal Terrestrial Radio Access (E-UTRA); LTE Positioning Protocol (LPP) (Release 14)", 3GPP TS 36.355 V14.3.0, Sep. 2017, pp. 1-168.

3GPP, "3rd Generation Partnership Project; Technical Specification Group Radio Access Network; Evolved Universal Terrestrial Radio Access Network (E-UTRAN); Stage 2 functional specification of User Equipment (UE) positioning in E-UTRAN (Release 14)", 3GPP TS 36.305 V14.3.0, Sep. 2017, pp. 1-78.

3GPP, "3rd Generation Partnership Project; Technical Specification Group Services and System Aspects; Universal Geographical Area Description (GAD) (Release 14)", 3GPP TS 23.032 V14.0.0, Mar. 2017, pp. 1-29.

Unknown, Author, "Addition of a New Positioning Method Based on Additional Sensors Measurements", 3GPP TSG RAN2 Meeting #101, R2-1803452, Ericsson, Sony, Athens, Greece, Feb. 26-Mar. 2, 2018, 15 pages.

Unknown, Author, "Discussion on hybrid positioning including IMU related estimates", 3GPP TSG-RAN WG2 Meeting #98, R2-1704462, Hangzhou, China, May 15-19, 2017, pp. 1-4.

Unknown, Author, "Draft LS on describing acceleration as a universal GAD", 3GPP TSG-RAN WG2 Meeting #99, R2-1709410, Berlin, Germany, Aug. 21-25, 2017, pp. 1-8.

Unknown, Author, "IMU positioning support over LPP", 3GPP TSG-RAN WG2 #98, Tdoc R2-1704743, Hangzhou, P.R. of China, May 15-19, 2017, pp. 1-4.

Unknown, Author, "IMU positioning support over LPP", 3GPP TSG RAN2 Meeting #99, R2-1709409, Berlin, Germany, Aug. 21-25, 2017, pp. 1-5.

Unknown, Author, "IMU sensor based positioning", 3GPP TSG-RAN WG2 Meeting #98, R2-1704750, Hangzhou, P. R. China, May 15-19, 2017, pp. 1-7.

Unknown, Author, "IMU Sensor Based Positioning", 3GPP TSG-RAN2 Meeting #99bis, R2-1711476, Intel Corporation, Ericsson, Sony, Prague, Czech Republic, Oct. 9-13, 2017, 7 pages.

Unknown, Author, "Introduction to IMU for indoor positioning", 3GPP TSG RAN WG2 Meeting #98, R2-1704826, Hangzhou, China, May 15-19, 2017, pp. 1-4.

Unknown, Author, "New WID: UE Positioning Accuracy Enhancements for LTE", 3GPP TSG RAN Meeting #75, RP-170813, Nokia, Alcatel-Lucent Shanghai Bell, Dubrovnik, Croatia, Mar. 6-9, 2017, 4 pages.

Unknown, Author, "Running CR for 36.355 Further Indoor Positioning Enhancements", 3GPP Tsg-Ran WG2 #95, R2-165694, NextNav, Goteborg, Sweden, Aug. 22-26, 2016, 15 pages.

* cited by examiner

METHOD AND APPARATUS FOR HANDLING POSITIONING OF A TARGET DEVICE

RELATED APPLICATIONS

This application is a continuation of U.S. application Ser. No. 16/345,382 filed 26 Apr. 2019, which is a U.S. National Phase Application of PCT/SE2019/050102 filed 7 Feb. 2019, which claims benefit of U.S. Provisional Application No. 62/627,962 filed 8 Feb. 2018. The entire contents of each aforementioned application is incorporated herein by reference.

TECHNICAL FIELD

Embodiments herein relate to positioning of target devices in wireless communication systems, such as cellular networks. In particular, the embodiments herein relate to a target device, a network node and methods therein for handling positioning of the target device.

BACKGROUND

In a typical wireless communication network, wireless devices, also known as wireless communication devices, mobile stations, stations (STA), sensors and/or User Equipment (UE), communicate via an access network such as a Radio Access Network (RAN) with one or more core networks (CN) or a Wi-Fi network. The RAN covers a geographical area which is divided into service areas or cell areas, which may also be referred to as a beam or a beam group, with each service area or cell area being served by a radio network node such as a radio access node e.g., a radio base station (RBS) or a Wi-Fi access point, which in some networks may also be denoted, for example, a NodeB, eNodeB (eNB), or Next Generation NodeB (gNB) as denoted in 5G. A service area or cell area is a geographical area where radio coverage is provided by the radio network node. The radio network node communicates over an air interface operating on radio frequencies with the wireless device within range of the radio network node.

Specifications for the Evolved Packet System (EPS), also called a Fourth Generation (4G) network, have been completed within the 3rd Generation Partnership Project (3GPP) and this work continues in the coming 3GPP releases, for example to specify a Fifth Generation (5G) network also referred to as 5G New Radio (NR). The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to RNCs used in 3G networks.

In general, LTE networks have support for a wide range of positioning methods. In order to fulfil high positioning accuracy requirements in different deployment conditions, the interest in hybrid solutions which explore two or more of these positioning methods at the same time are increasingly extended. Some sensor measurements in a target device, such as a UE, may provide useful information in terms of positioning in relation to a specific reference, such as e.g. a reference position and/or a reference time, such as e.g. a reference displacement time. In 3GPP Rel.14, support for barometric pressure sensor was introduced, thereby providing a solution for estimation of a vertical position of the UE. The ongoing 3GPP Rel.15 work item on accurate positioning includes support for sensor measurements.

A coordinate system in geography is a coordinate system that designates every location on earth with a specified set of numbers. This enables any location to have a specified vertical position and a horizontal position which allows a certain point to be located on the surface of the earth. A further set of numbers indicate the elevation of the same point with respect to a fixed datum, generally the sea level.

This can vary depending on the country or region under consideration. It is also possible to locate positions with Cartesian coordinates which gives the distances in all the three axes from a fixed point which is considered as the center of the earth, although it is the center of the mass of the earth which is actually considered, as this is easier to locate.

The absolute location helps to determine the location of a target device or a place with respect to certain coordinates that themselves have a fixed reference. A relative position or displacement of the target device is determined in reference to certain known locations or positions. The absolute location of the target device may be determined with the help of longitudinal and latitudinal lines. These indicate the position of the target device on the surface of the earth. The displacement from a known position to a position relative to the known position, i.e. the relative position, may herein also be referred to as a relative displacement. The term relative displacement and displacement may herein be used interchangeably.

The following positioning techniques are some of the techniques considered in LTE:

Assisted Global Navigation Satellite System (GNSS). GNSS information indicating an "absolute" position, e.g. in terms of coordinates, can sometimes be retrieved by the UE, supported by assistance information provided to the UE from E-SMLC.

Observed Time Difference of Arrival (OTDOA). The UE estimates the time difference of reference signals from different base stations and sends the resulting OTDOA to the E-SMLC for positioning of the UE by multi-lateration.

These position techniques are however battery consuming and have limitations when the UE is located indoors. In 3GPP Rel. 15 work item, solutions for improving indoor positioning have been discussed. These solutions suggest using sensors comprised in the UE to determine a displacement of the UE.

The varying UE capabilities in translating the sensor measurements to a displacement does however create an uncertainty at the location server regarding the quality of the displacement estimation.

SUMMARY

It is an object of embodiments herein to enhance performance of a wireless communications network, in particular by improving positioning of a target device.

Embodiments herein relate to a target device, such as e.g. a UE, a network node and methods therein.

According to a first aspect of the embodiments herein the object is achieved by a method performed by a target device, for handling positioning of the target device. The target device determines a displacement of the target device in relation to a reference position based on measurements performed by at least one location source. The reference position is a position determined at a previous time instance. The target device sends a report comprising the determined displacement of the target device, a reference time to which the reference position is associated.

According to a second aspect of the embodiments herein the object is achieved by a method performed by a network node, such as e.g. a location server or a radio network node, for handling positioning of a target device. The network node obtains, from the target device, a report comprising one or more displacements of the target device in relation to a reference position. The one or more displacements have been determined based on measurements performed by at least one location source. The report further comprises a reference time to which the reference position is associated. The network node determines an absolute position of the target device based on the obtained one or more displacements and the reference position associated to the reference time.

According to a third aspect of the embodiments herein the object is achieved by a target device, for performing a method for handling positioning of the target device. The target device is configured to determine one or more displacements of the target device in relation to a reference position based on measurements performed by at least one location source. The target device is further configured to send, to a network node, a report comprising the determined one or more displacements of the target device and a reference time to which the reference position is associated.

According to a fourth aspect of the embodiments herein the object is achieved by a network node, for performing a method for handling positioning of a target device. The network node is configured to obtain, from the target device, a report comprising one or more displacement of the target device in relation to a reference position, wherein the one or more displacements have been determined based on measurements performed by at least one location source, and a reference time to which the reference position is associated. The network node is further configured to determine an absolute position of the target device based on the obtained one or more displacements and the reference position associated to the reference time.

By reporting the displacement from the reference position and the time, e.g. as time stamps, of the measurements performed as well as the delta time, e.g. as a delta time stamp, between the performed measurements and the reference time at which the reference position was obtained, the network node may determine the position of the target device in scenarios where no GNSS measurements are available.

By only reporting the displacement of the target device instead of the absolute position may also reduce the amount of data transmitted in the network, which increases the performance and throughput in the network.

Thereby, the embodiments herein improve the positioning, such as the accuracy of the positioning, of the target device.

DETAILED DESCRIPTION

Figure 1:
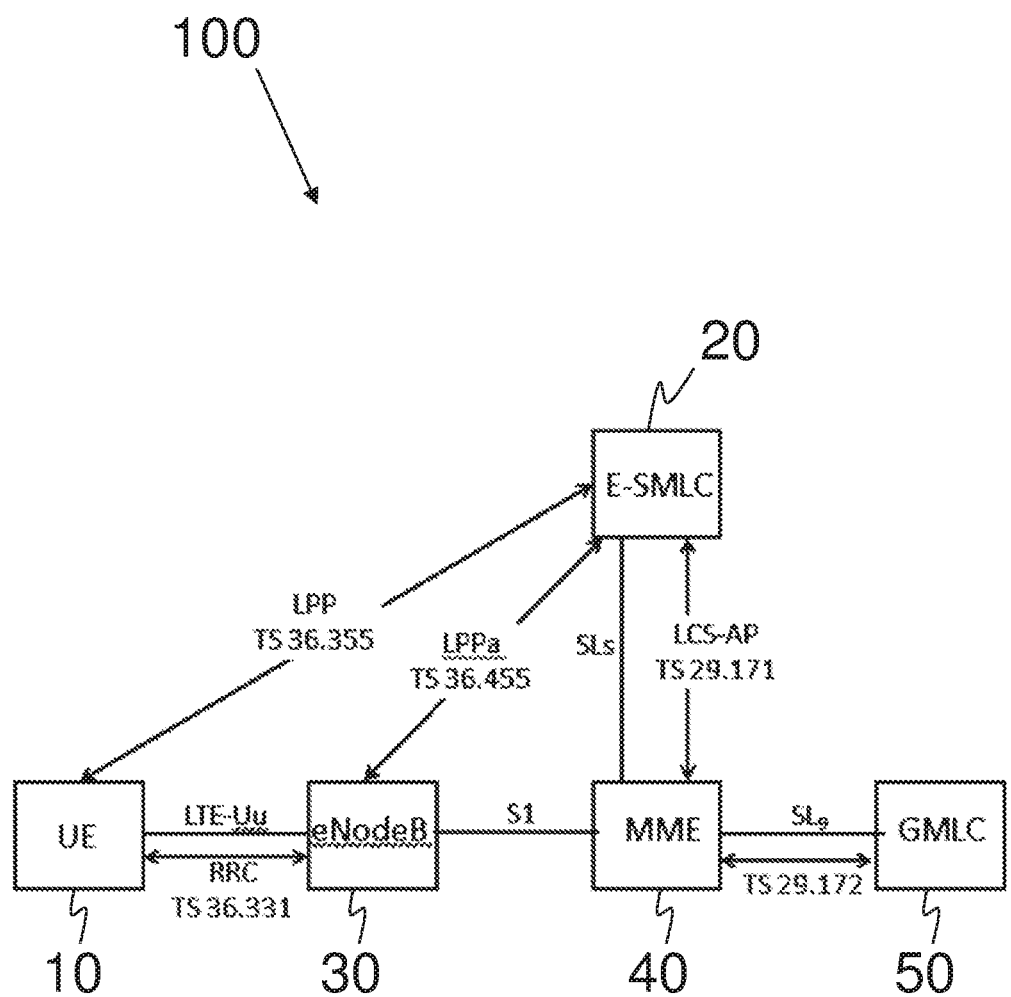
FIG. 1 is a schematic block diagram illustrating an LTE positioning architecture.

Most of the UEs in the market today are equipped with an Inertial Measurement Unit (IMU). The IMU may comprise for example a 3-axis gyroscope and a 3-axis accelerometer. The use of the IMU may increase the positioning performance, it may however also be used to reduce the need of measurements, such as e.g. GNSS and/or OTDOA, conducted at a target device, such as the UE. In the following, target device and UE may be used interchangeably.

The measurements of these sensors may be fused, which may also be referred to as combined, to form an estimate of the UE's position. However, a positioning system solely based on IMU is a relative positioning system, in other words it may estimate the position of the UE in relation to a known coordinate, which may also be referred to as the reference position.

The IMU, which may also be referred to as an inertial navigation system (INS), is based on motion sensors, such as e.g. accelerometers, rotation sensors, such as e.g. gyroscopes, and occasionally magnetic sensors, such as e.g. magnetometers that continuously, via dead reckoning, calculate the position, orientation, and velocity (direction and speed of movement) of the UE. This information in combination with a reference point report may help the network to provide further improved positioning accuracy and tracking capabilities for moving UEs. Being based on motion sensors shall herein be interpreted as comprising motion sensors and performing calculation based on the comprised sensors.

In 3GPP Rel. 15 work item in indoor positioning, it was agreed to:
Specify support for IMU positioning:
Specify the signaling and procedure to support IMU positioning over LPP and hybrid positioning including IMU related estimates. [RAN2, RAN1]

The 3GPP Rel.15 UEs will therefore report their sensor data, i.e. the data from the locations sources, mainly for enabling a displacement estimation at a location server. In addition to IMU, also light sensors are under discussion to be reported, and pressure sensors are already standardized from earlier releases.

In general, there are three positioning modes, UE assisted, UE based and Stand-alone. UE assisted mode requires support from a Location server (LS) to determine their absolute location. The UEs using this mode may send necessary information and measurements to the LS which may then determine an absolute position of the UE. For UE based and Stand-alone modes, the UE may be capable of determining its absolute position by itself. Thus, there is no need to send measurement data to the LS. In UE assisted and UE based positioning modes, the LS may calculate and determine how often the UE should report its location whereas in stand-alone case the UE would do itself. The term absolute position shall herein be interpreted as a known coordinate in an earthbound coordinate system, such as e.g. the World Geodetic System (WGS), which allows the location of the UE to be specified as a vertical position and a horizontal position which allows the UE to be located on the surface of the earth, and an elevation of the UE in the same location with respect to a fixed datum, such as e.g. the sea level.

The displacement shall be interpreted as a displacement from a reference position which is known to the target device and the network node at a specific time instance, which may be referred to as the reference time. The reference position may e.g. be an absolute position of the target device or a position reported by the target device or determined by the network node at an associated time instance, which may be referred to as the reference time. In other words, each reference position will have an associated reference time, which may be the time at which the reference position was measured or and/or reported. Hence, when a certain previously determined position of the target device is used as a reference position, the associated time at which the position was determined will be the reference time.

Varying UE capabilities in translating the sensor measurements to a displacement may create an uncertainty at the location server regarding the quality of the displacement estimation. Some UEs may be capable of fusing together a result of multiple sensors to an accurate displacement, while other UEs may be less capable of translating the sensors, such as e.g. the measurements performed by the sensors, to an accurate displacement.

For example, a UE not equipped with pressure sensors has less capability to estimate its displacement in altitude compared to a UE equipped with a pressure sensor. Also, a UE with high sensor sampling frequency may update the position frequently, while a UE with lower sampling rate might simply extrapolate the locations when reporting multiple displacements. Advanced UEs may use systems like Pedestrian Dead Reckoning (PDR) to estimate the displacement, while other UEs may use environment information, such as e.g. moving inside a tunnel, to estimate the displacement.

Other types of sensory information may also be used. Previously, barometric pressure sensors have been included in an LTE positioning protocol (LPP). Other types of sensors of interest may for example be light sensors, where recent investigations have indicated that UE light sensors may be used to detect whether the UE is indoors. For example, the UE may use the light sensor and/or a camera to measure ambient light, which may be used to classify whether the UE is indoors or outdoors, e.g. when the UE enters a tunnel, e.g. in a moving vehicle. A vehicle mounted camera may e.g. measure relative distance when entering the tunnel. The sensor may for example measure a light intensity, but it may also analyze spectral properties of the ambient light to identify characteristics of light bulbs, LEDs, fluorescent light, halogen lights or other light sources typically found indoors. An indication as to whether the UE has moved from outdoor to indoor or vice versa may thus be estimated using the light sensors.

Furthermore, there currently exists no procedure at the location server to indicate what sensors the UE should use when fusing a displacement. In some regions, some sensors might perform badly, for example barometer inside pressure compensated buildings. The UEs might not have knowledge of this when doing the displacement estimation.

FIG. 1 illustrates an example of an LTE positioning architecture in a communications network 100 according to a first scenario in which embodiments herein may be implemented. The communications network 100 is a wireless communication network such as e.g. a 5G, LTE, E-Utran, WCDMA, GSM network, any 3GPP cellular network, Wimax, or any cellular network or system. The communications network 100 comprises a Radio Access Network (RAN) and a Core Network (CN). The communication network 100 may use any of a number of different technologies, such as Long Term Evolution (LTE), LTE-Advanced, 5G, Wideband Code Division Multiple Access (WCDMA), Global System for Mobile communications/Enhanced Data rate for GSM Evolution (GSM/EDGE), Worldwide Interoperability for Microwave Access (WiMax), Ultra Mobile Broadband (UMB), or Wi-Fi, just to mention a few possible implementations. In the communication network 100, one or more target devices 10 may communicate via one or more Access Networks (AN), e.g. RAN, with one or more CNs. The target device 10 may e.g. be a UE, a wireless device (WD), a mobile station, a non-access point (non-AP) STA, a STA, a sensor, and/or a wireless terminal. It should be understood by those skilled in the art that "wireless device" is a non-limiting term which means any terminal, wireless communication terminal, user equipment, Machine Type Communication (MTC) device, Device to Device (D2D) terminal, or node e.g. smart phone, laptop, mobile phone, sensor, relay, mobile tablets or even a base station communicating within a cell.

The RAN comprises a set of radio network nodes 30 each providing radio coverage over one or more geographical areas, such as a cells or beams, using a radio access technology (RAT), such as 5G, LTE, UMTS, Wi-Fi or similar. The radio network node 30 may be a radio access network node such as a radio network controller or an access point such as a wireless local area network (WLAN) access point or an Access Point Station (AP STA), an access controller, a base station, e.g. a radio base station such as a gNB, NodeB, an evolved Node B (eNB, eNodeB), a base transceiver station, Access Point Base Station, base station router, a transmission arrangement of a radio base station, a stand-alone access point or any other network unit capable of serving a wireless device within the cell, which may also be referred to as a service area, served by the radio network node 30 depending e.g. on the radio access technology and terminology used.

The CN further comprises one or more core network nodes, such as e.g. a Mobility Management Entity (MME) 40 and/or a Gateway Mobile Location Centre (GMLC) 50, which may be configured to communicate with the radio network nodes 110, 111, via e.g. an S1 interface. The core network node may e.g. be a Mobile Switching Centre (MSC), an MME, a GMLC, an Operations & Management (O&M) node, an Operation, Administration and Maintenance (OAM) node, an Operations Support Systems (OSS) node and/or a Self-Organizing Network (SON) node. The core network node 140 may further be a distributed node comprised in a cloud 141.

The target device 20 may further be configured to communicate over a plurality of different RATs, such as 5G, LTE, UMTS, Wi-Fi or similar.

Note that although terminology from 3GPP LTE has been used in this disclosure to exemplify the embodiments herein, this should not be seen as limiting the scope of the embodiments herein to only the aforementioned system. Other wireless systems, including WCDMA, WiMax, UMB, GSM network, any 3GPP cellular network or any cellular network or system, may also benefit from exploiting the ideas covered within this disclosure.

The exchange of messages between a target device 10, such as e.g. a UE, and the network node 20, such as e.g. a location server such as an Evolved Serving Mobile Location Center (E-SMLC), which may also be referred to as a LS, may be performed via the LPP. Other cellular networks may have a slightly different architecture, thus the embodiments herein shall not be limited to being performed over LPP. The embodiments herein may also be performed over similar protocols in other cellular networks According to embodiments herein the target device 10, such as the UE, may signal the location source that was used for estimating the displacement to the network node 20, such as e.g. the location server. The location server may signal a set of preferred sensors or location sources used for estimating the displacement. One type of location source may be sensors like e.g. IMU, another source may be a PDR system. Light sensors and other sources may also be used to provide useful information on the indoor-outdoor change environment in the relative reported displacement.

When configuring location source measurements, such as IMU measurements, and reports it may not be obvious what to measure that would be representative for a time period and that may be relevant for a server. Compared to a UE-based solution, which may also be referred to as a UE-based mode, the UE-assisted solution, which may also be referred to as a UE-assisted mode, implies delayed measurements and also the need to condense the observations to compressed reports, whereas a UE-based solution may benefit from raw measurement data with frequent updates. Location source measurements, such as IMU measurements, are mainly used for determining displacements and may be used in combination with a reference point, such as e.g. a reference position determined at a reference time, in order to determine an actual location of the target device 10, such as e.g. the UE. The time reference may e.g. be a System Frame Number (SFN).

Figure 2:
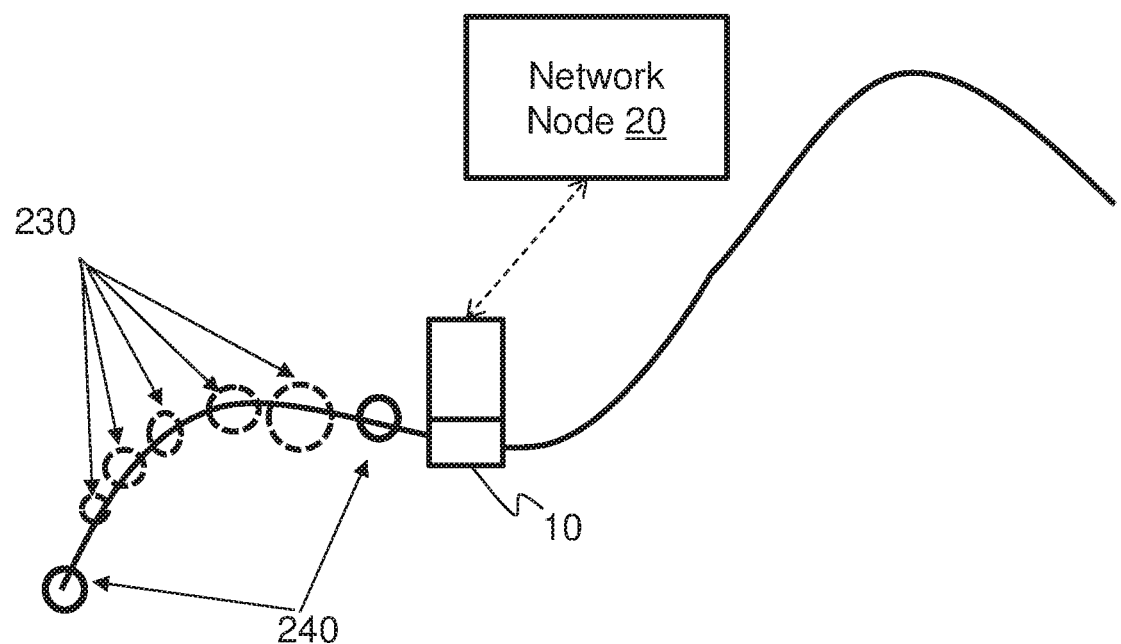
FIG. 2 is a schematic block diagram illustrating an example measurement of time series.

The embodiments herein concern a flexible location source, such as IMU, measurement reporting scope, where a target device 10 may adapt the report content based on actual measurements, such as both IMU measurements and associated measurements. An example of a concerned scenario is illustrated in FIG. 2, in which the target device 10, such as e.g. the UE, is associated to the network node 20, and where the target device 10 makes, which may also be referred to as performs, one or more IMU measurements at IMU measurement instants 230 over a time window. Each measurement instant 230 may herein also be referred to as a segment or a measurement segment. At the measurement instant 230 the target device may determine the displacement in relation to a previous measurement instant 230. This displacement may corresponds to the displacement of the target device over the segment spanning from the previous measurement instant to the current measurement instant 230. At each measurement instant the target device may determine the displacement of the target device 10 as well as the time difference, which may also be referred to as a delta time, in relation to one or more previous measurement instants. The target device 10 may further be requested to report IMU information, such as the IMU measurements, at report instants 240.

Figure 3:
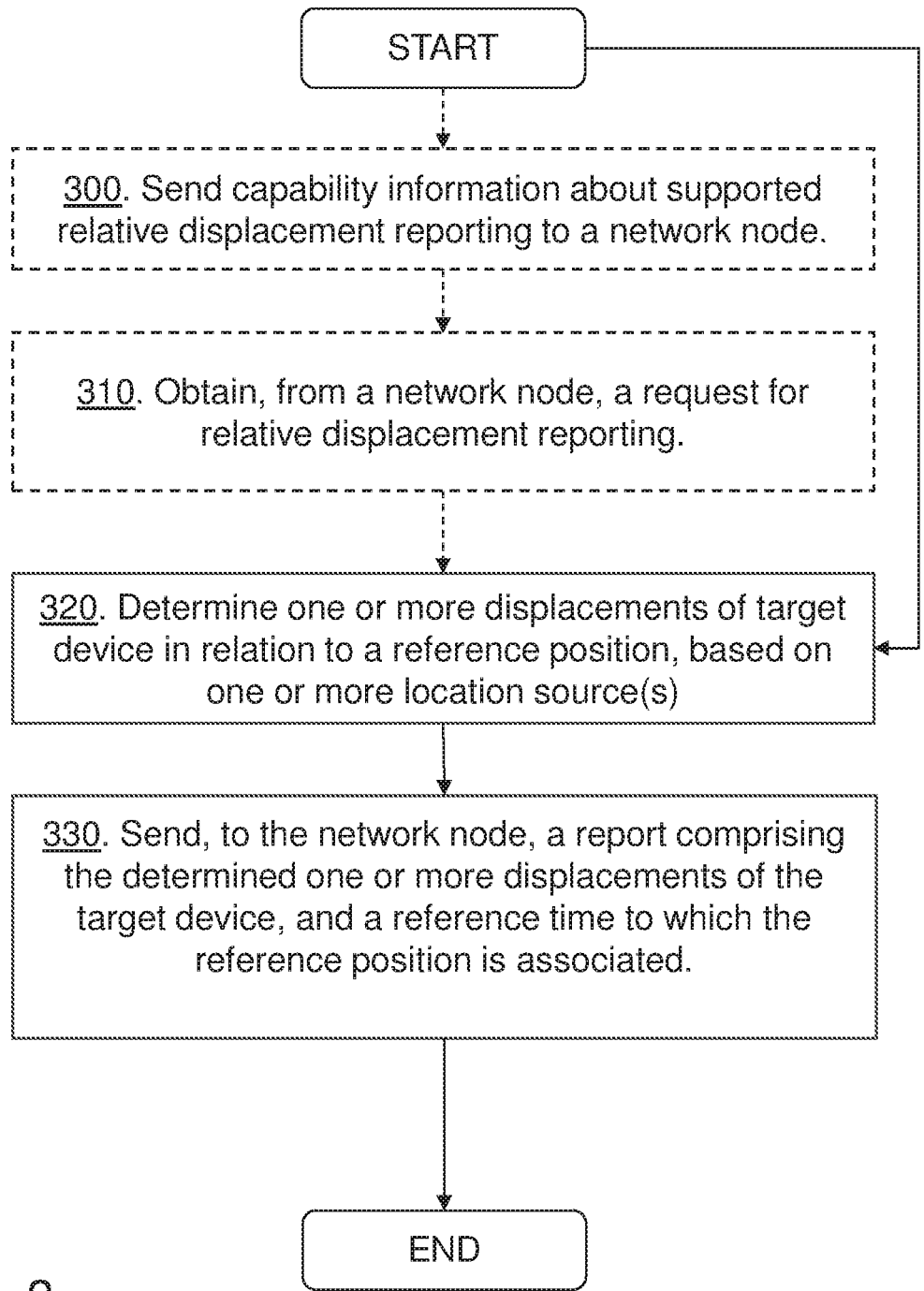
FIG. 3 is a flowchart depicting a first embodiment of a method performed by a target device.
Figure 4:
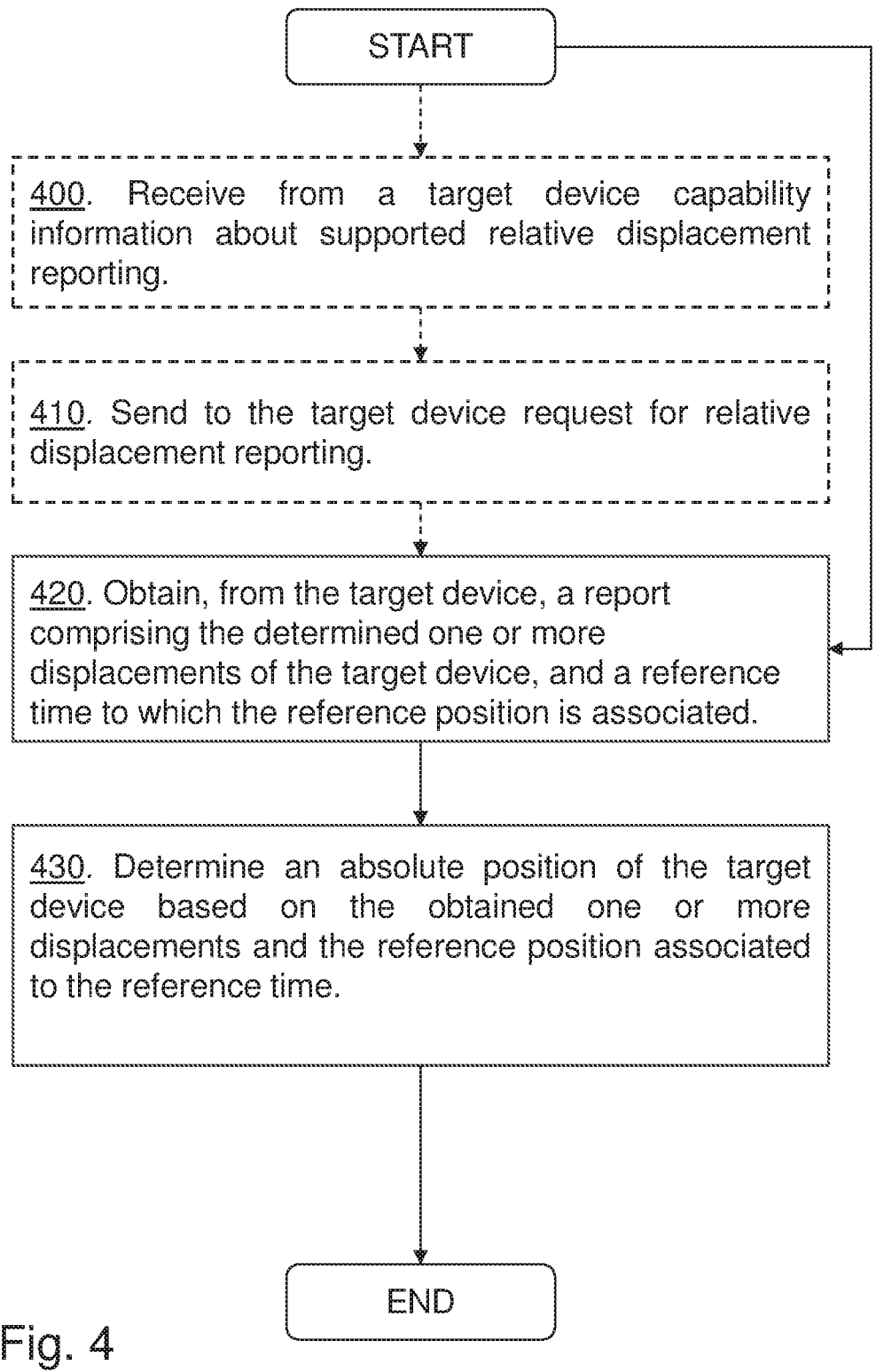
FIG. 4 is a flowchart depicting a first embodiment of a method performed by a network node.

FIGS. 3 and 4 present the basic steps of the embodiments disclosed herein from a perspective of the target device 10 and the network node 20, which may be providing the location service respectively.

Some capable target devices 10 may translate sensor data to a displacement, and may report the displacement to the network node 20, such as e.g. a location server or a radio network node. Reporting the displacement directly reduces the need of signaling an excessive amount of sensor data, the downside is however less control at the location server of how the sensor data was translated to a displacement by the target device 10.

The embodiments herein propose a method for target devices 10, such as e.g. UEs, to signal the "location source" used when estimating the displacement. This solution may be useful for both UE-based and UE-assisted sensor-based positioning methods.

In the UE-based and UE-assisted methods, the target device 10, such as the UE, may optionally receive a list of location sources that it may use to estimate the displacement or a list of what location sources it may use based on environmental parameters from the location server, such as e.g. a network node 20. In the UE-assisted case, the UE may send the location source together with the displacement estimation to the location server.

In the UE based mode, the target device 10, such as the UE, may have used sensor measurements or integrated sensor measurements with OTDOA and/or GNSS to determine the absolute position. However, the exact location source and the time since the target device 10 started using integrated location source methods are unknown to the location server, such as e.g. a network node 20.

Location Info List

An Information Element, which may be referred to as LocationInfoList, may comprise a time stamp of the current time and the delta time stamp in comparison to a reference point, wherein the reference point is a point in time. Also, an estimate of the location, velocity and acceleration may optionally be reported by the target device 10 based on available sensors in the target device 10. The term current time as used herein shall be interpreted as the time at which the measurement of the displacement is made.

In the UE assisted mode, the report from the target device 10 may comprise multiple displacements, and the target device 10 may signal the location sources used for each displacement. The target device 10 may perform the multiple displacement measurements and may report the multiple measurements, e.g. as a series of measurements, at a later time instance. In this case the report may comprise a time stamp of the current time for each individual measurement, which may also be referred to as segment, in the series of measurements. In another embodiment, the target device 10 may indicate that one location source was used for all displacements. The location sources used by the target device 10 to determine the displacement may be one or more of:

Sensor based, such as e.g.:
   Barometric pressure, which provides the vertical position estimation and requires some other source for horizontal accuracy.
   Inertial Measurement Unit (IMU), which in one embodiment provides position estimation based on an aggregated measurement from two or more of the IMU measurements supported at the target device 10 or has separate position estimation for each sensor measurement.
   Accelerometer
   Magnetometer
   Gyroscope
Light Sensors (indoor-outdoor estimation), which the UE indicates the probability that the UE has moved in-out, out-in or stayed put in-in or out-out, compared to a reference position.
Humidity sensor (indoor-outdoor estimation)
Temperature sensor (indoor-outdoor estimation)

System based, such as e.g.:
PDR
Environment based; the target device 10 knows the movement environment, such as e.g. when moving inside a tunnel, and may combine this information with IMU sensors.
Extrapolated position based on previous displacements.

The definition of the location source for displacement estimation may e.g. be generic, such as stating that a sensor has been used, or more specific, such as stating the type of sensor that has been used.

The network node 20 and/or the LS may use the next, which may also be referred to as the following and/or the subsequent, received GNSS/OTDOA measurement to assess the performance of the location source. After the next GNSS/OTDOA session, if the displacement estimate matches the updated location, the network node 20 may request GNSS/OTDOA measurements less frequently. If the network node 20 and/or the LS has received an indication of the location sources used by the target device 10 for estimating the displacement, the network node 20 and/or the LS may further use the result of the performance assessment to determine the performance of each location source. The network node 20 and/or the LS may, based on the performance assessment, signal a set of sensors to the target device 10 that should be used for estimating the displacement, since some sensors might be inadequate in certain environments. The network node 20 and/or the LS may e.g. use the performance assessment to determine a confidence factor of the location source, which may also be referred to as the reliability of the report from the location source. In other words, the report may be used to determine a reliability of the results of other positioning methods, such as e.g. OTDOA Time Of Arrival (TOA) estimation.

In the UE based mode, the target device 10 may report an absolute position. For the case when the target device 10 has started to use sensor based positioning methods, the target device 10 may signal the one or more location sources used and the time from the sensor measurements that have been used for computing the absolute location. This may be sent or signaled to the network node 20, such as e.g. the LS. The time here refers to the instant when the target device 10, such as e.g. the UE, starts to use sensor measurement as illustrated in the example when a GPS signal is lost. In some scenarios the GNSS signal may be lost when the target device 10 enters into e.g. the tunnel, thus the only reliable source left on the target device 10 for estimating its position may be the sensors within the target device 10. Thus, when the position is later reported again as pure GNSS or GNSS+ Sensors, the LS may estimate if the previous trajectory that was reported by using sensor methods were correct or not. Depending upon that, i.e. based on the estimate, the LS may determine the GNSS measurement frequency required. The information in the IMU measurement report may be combined with results obtained from other positioning methods such as e.g. GNSS to improve the location accuracy. In this scenario, the target device 10 is initially reporting its position using GNSS; the target device 10 enters inside a tunnel and loses the GNSS signal. The target device may have a known time and a corresponding position for when it lost the GNSS signal. The target device 10 may use the known time and associated position as an initial measurement point. The time and the position of the initial measurement point may be used as the reference time and reference position in relation to which the target device determines its displacement using one or more of the location sources. The target device 10 may then report, to the network node 20, an indication of the reference time and reference position together with one or more determined displacements and an indication of the time at which the one or more displacements were determined. The time when the displacements were determined, may e.g. be indicated by indicating a delta time between the reference time and the time when each of the one or more displacements were determined and/or by reporting a time stamp of the time at which the displacement was determined.

In the UE assisted mode, the network node 20 may, based on an initial reference time and reference position (x1, y1), calculate a relative time and position (x2,y2), (x3, y3), ... (xn, yn) for a number of "n" determined displacements in relation to the initial reference time and reference position (x1, y1) in order to determine the position of the target device 10.

The network node 20 and/or the LS, may for the UE assisted and UE based modes, use the location source information for observation, such as e.g. for performance measurements, to see how much sensor information in the target device 10 is being utilized for location information and to identify which sort of location source is the most widely used. The network node 20 and/or the LS may also estimate a correctness level of various location source methods and this information may be reported to interested parties such as e.g. IMU sensor manufacturer, operators etc.

In the following, method steps according to embodiments herein will be described in more detail.

FIG. 3 illustrates the main steps of the embodiments herein seen from a perspective of the target device 10.

Action 300: In a first optional step, the target device 10 may send information to the network node 20 about its capabilities in association to reporting of displacements. In some embodiments the target device 10 sends capability information about supported location sources for displacement reporting to the network node 20. The supported location sources may e.g. be the sensors available in the target device 10 for determining a displacement of the target device 10.

The sending of the capability information may optionally be triggered by a capability request message from the network node 20 and/or the LS. In other words, the capability request may be received from the network node 20.

Action 310: Furthermore, also optionally, the target device 10 may obtain a request for displacement reporting from the network node 20 and/or the LS. Optionally, the network node 20 and/or the LS may provide the target device 10 with a reference position and/or a reference time. The reference position and/or the reference time may be used to indicate the position in relation to which the displacement is to be determined. The reference time may e.g. indicate a time at which a previous location was reported by the target device. By receiving the reference time the target device knows that the position reported in relation to the reference time shall be used as the reference position when measuring and/or reporting the displacement. The reference position and or reference time are known to both the target device 10 and the network node 20. When the target device 10 receives the reference time it may use this time to In some embodiments, the request for displacement reporting comprises at least one preferred location source and/or a reference position.

Action 320: The target device 10 may determine the displacement in relation to the reference position based on one or more location sources. The target device 10 may determine one or more displacements in relation to the reference position. The reference position may either be a position that the target device 10 has obtained from the network node 20 and/or the LS in the previous step, or a position that the target device 10 has estimated using any specific positioning method, such as e.g. GNSS, OTDOA or based measurements performed using at least one location source. The at least one location source may e.g. be a sensor, such as e.g. an IMU, a light sensor, a motion sensor, such as e.g. an accelerometer or a gyro, a barometric pressure sensor a PDR system, and/or a camera.

Action 330: When the target device 10 has determined the displacement, the target device 10 reports the displacement of the target device 10 in relation to the reference position to the network node 20 and/or the LS. The target device 10 may also indicate how the displacement has been determined. The report of the displacement may further comprise an indication of the reference position of the target device 10 at an initial measurement point. The indication may e.g. be the actual position or a reference to a previously reported position which shall be used as reference. The reference to the previously reported position may e.g. be the time associated to the reference position such as the time at which the reference position was obtained, which may also be referred to as the reference time. The report may further comprise a time stamp of the current time at which the displacement was determined and the reference position may be indicated by reporting a delta time stamp in comparison to a reference time at which the reference position was obtained. This may e.g. be indicated in the Location Info List IE. The indication of the reference position allows the network node to identify the reference position used for determining the displacement. The report may further comprise an indication of how the displacement has been determined, such as e.g. the one or more location sources that has been used for determining the displacement. The measurement point may e.g. be a point in time, which may be indicated using e.g. a SFN. The initial measurement point as described herein shall be interpreted as the measurement point, with regards to which the displacement measurements are started. The measurement point may be the last known absolute position and the associated time stamp of the target device. This may e.g. be the last position and associated time reported prior to GNSS positioning being no longer available and the displacement measurements being performed using the location sources. The report sent to the network node may further comprise a delta time stamp of a current time when each of the one or more displacements were determined in comparison to the reference time.

The indication of the location source enables the network node to acquire knowledge about the used location source, which may be used with prior knowledge of the environment to estimate an uncertainty of the displacement and in the resulting position estimation. For example, in some scenarios, pressure sensors may be inadequate due to the environment, leading to less accurate location estimation.

Another advantage is that the network may assess the capability of the target device, thereby allowing the network node to make a better trade-off between displacement based location, and more battery consuming procedures like GNSS and/or OTDOA.

Another advantage is that the network node may signal a set of sensors to the target device that should be used for estimating the displacement, since some sensors might be inadequate in certain environments.

According to one embodiment, the target device 10 may have obtained a reference position and/or a reference time, such as e.g. a reference SFN, and the target device 10 may report both the reference position and an estimated position, where the displacement is the difference between these two positions.

In another embodiment, the target device 10 may not have obtained a reference position. Instead, it may report location information at a prior time, for example information to enable the location server to estimate an absolute position. In this embodiment, the target device 10 may report two positions, firstly a reference position at the prior time, corresponding to the estimated absolute position, and secondly the position at the current time, where the displacement is represented by the difference between the second position and the reference position. It shall be noted that these two positions do not need to be accurate or even close to the true position, since the displacement is encoded as the relative difference between the two.

According to another embodiment, the target device 10 may report the displacement explicitly, and either an obtained reference position, optionally at a reference time, or a reference time.

The reference time as well as the time of each segment may be given as a combination of an absolute time in Universal Time Coordinated (UTC), and a separate delta time, indicating the additional delta time to enable finer time resolution than UTC can support. The time of each segment corresponds to the time of each measurement instant 230 as described in relation to FIG. 2. The reference time may also be given as an SFN.

According to another embodiment, the current position may be represented by an existing attribute for position estimates, while the reference position may be represented by an item in a separate location information list, which may be denoted LocationInfoList. The existing attributes may e.g. be locationCoordinateTypes, such as e.g. an ellipsoidPoint, an ellipsoidPointWithUncertaintyCircle, an ellipsoidPointWithUncertaintyEllipse, a polygon, an ellipsoidPointWithAltitude, an ellipsoidPointWithAltitudeAndUncertaintyEllipsoid, and/or an ellipsoidArc.

In yet another embodiment, the reference position may be represented by the existing attribute for position estimates, while the current position may be represented by an item in a separate location information list.

In yet another embodiment, the target device 10 may report historical positioning information via the location information list.

In yet another embodiment, the target device 10 may separate the displacements, and optionally velocity and/or acceleration, in one or more segments. In one mode of the embodiment, each segment may be characterized by a position at the start of the segment, and/or a velocity estimate constant over the segment, and/or an acceleration estimate constant over the segment. The existing location information attribute may e.g. represent the current position, which is at the end of the last segment, i.e. the segment associated to the latest time reference.

According to some embodiments, the position estimate associated with each segment may instead represent the end of the segment. In these embodiments, the existing location information attribute may represent the position in the beginning of the first segment, i.e. the segment associated to the earliest time reference. The position in the beginning of the first segment may be used as the reference position when estimating the position at the end of the segment, e.g. by determining the displacement from the position in the beginning of the first segment.

FIG. 4 illustrates the main steps of the embodiments herein seen from a perspective of the network node 20.

Action 400: According to a first optional step, the network node 20 may obtain capabilities of the target device 10 in association to reporting of displacements from the target device 10. In some embodiments this report may be triggered by a capability request message sent to the target device 10 from the network node 20 and/or the LS which may be comprised in the network node 20. The capabilities in association to reporting shall herein be interpreted as the sensor data that the UE is capable of reporting.

In some embodiments, the network node 20 may receive, from the target device 10, capability information about supported location sources for displacement reporting.

Action 410: Furthermore, also optionally, the network node 20 and/or the LS may send a request for displacement information reporting to the target device 10. Optionally, the network node 20 and/or location server may provide the target device 10 with a reference position and/or a reference time, which the target device shall use when determining the displacement.

The request may comprise at least one preferred location source and/or a reference position.

Action 420: The network node 20 and/or the LS obtains a report, from the target device 10, wherein the report comprises the displacement, such as the one or more displacements, of the target device 10 in relation to the reference position. The one or more displacements of the target device may be reported in relation to a reference position, wherein the one or more displacements have been determined based on measurements performed by at least one location source, and a reference time to which the reference position is associated. The report may also indicate how the displacement has been determined, such as e.g. the one or more location sources that has been used for determining the displacement. The at least one location source may e.g. be a sensor, such as e.g. an IMU, a light sensor, an accelerometer, a gyro, a barometric pressure sensor and/or a PDR system.

In some embodiments, the report of the displacement may comprise the indication of the reference position of the target device 10 at the initial measurement point. The indication may e.g. be the actual position or a reference to a previously reported position which shall be used as reference. The reference to the previously reported position may e.g. be the time at which the reference position was obtained, which may also be referred to as the reference time. The report may further comprise a time stamp of the current time at which the displacement was determined and the reference position may be indicated by reporting a delta time stamp in comparison to a reference time at which the reference position was obtained. This may e.g. be indicated in the Location Info List IE. The indication of the reference position allows the network node to identify the reference position used for determining the displacement.

Action 430: Based on the obtained information, the network node 20 and/or the LS may estimate the absolute position of the target device 10. The network node determines an absolute position of the target device 10 based on the obtained one or more displacements and the reference position associated to the reference time comprised in the report.

In one embodiment, the network node 20 and/or the LS may retrieve the displacement of the target device 10 from the report, and may combine the displacement with information about the absolute position at a prior time. The absolute position at the prior time may correspond to the reference position used by the target device for determining the displacement where the prior time matches the reference time indicated by the target device 10 in the report. Furthermore, the network node 20 and/or the LS may estimate the position by combining the absolute position at the prior time with the information about the displacement received from the target device 10.

Signaling support:

The proposed solution may require certain signaling between the network node 20 being configured as a location server and the target device 10. In LTE, the protocol used for such signaling is LPP. Similar extensions may be proposed for 5G to support sensor based positioning in New Radio (NR).The 3GPP specifications 36.305 v14.3.0 and 36.355 v14.4.0 may e.g. be extended with a field denoted LocationInfoList-r15.

Since position and velocity estimates have previously been handled in the common part 3GPP specifications 36.305 and 36.355, it is reasonable to include the LocationInfoList to the common part as well. This also opens up one alternative to encode displacement. The target device 10 may use this LocationInfoList with two entries to encode the reference time and/or reference position and the final time and/or position, such as e.g. the time and measured position at a measurement instant 230, as a way to encode the relative position. The final time and the final position shall herein be interpreted as the current time and position during a displacement measurement for determining the displacement in relation to the reference time and/or reference position. The signaling in ASN1 may for example be according to:

```
Common part:
-- ASN1START
CommonIEsProvideLocationInformation ::= SEQUENCE {
    locationEstimate            LocationCoordinates         OPTIONAL,
    velocityEstimate            Velocity                    OPTIONAL,
    locationError               LocationError               OPTIONAL,
    ...,
    [[      earlyFixReport-r12          EarlyFixReport-r12 OPTIONAL
    ]]
    [[      locationSource-r13          LocationSource-r13   OPTIONAL,
        locationTimestamp-r13           UTCTime                          OPTIONAL,
    ]],
    [[ locationInfoList-r15   LocationInfoList-r15    OPTIONAL
    ]]
}
LocationInfoList-r15 ::= SEQUENCE (SIZE(1..maxSegments-r15)) OF LocationInfoSegment-r15
LocationInfoSegment-r15 ::= SEQUENCE {
    locationTimestamp -r15          UTCTime                 OPTIONAL,
        locationTimestampDelta-r15      INTEGER(0..TBD)         OPTIONAL,
```

```
    locationEstimate-r15            LocationCoordinates         OPTIONAL,
    velocityEstimate-r15            Velocity                    OPTIONAL,
    accelerationEstimate-r15        Acceleration-r15            OPTIONAL,
}
LocationCoordinates ::= CHOICE {
    ellipsoidPoint                              Ellipsoid-Point,
    ellipsoidPointWithUncertaintyCircle         Ellipsoid-PointWithUncertaintyCircle,
    EllipsoidPointWithUncertaintyEllipse
    EllipsoidPointWithUncertaintyEllipse,
    polygon
    Polygon,
    ellipsoidPointWithAltitude                  EllipsoidPointWithAltitude,
    ellipsoidPointWithAltitudeAndUncertaintyEllipsoid
    EllipsoidPointWithAltitudeAndUncertaintyEllipsoid,
    ellipsoidArc                                EllipsoidArc,
    ...
}
Velocity ::= CHOICE {
    horizontalVelocity                          Horizontal Velocity,
    horizontalWithVerticalVelocity
    HorizontalWithVerticalVelocity,
    horizontalVelocityWithUncertainty           HorizontalVelocityWithUncertainty,
    horizontalWithVerticalVelocityAndUncertainty
    HorizontalWithVerticalVelocityAndUncertainty,
    ...
}
Acceleration-r15 ::= CHOICE {
    horizontalAcceleration
    HorizontalAcceleration,
    horizontalWithVerticalAcceleration          HorizontalWithVerticalAcceleration,
    horizontalVelocityWithUncertainty
    HorizontalAccelerationWithUncertainty,
    horizontalWithVerticalAccelerationAndUncertainty
    HorizontalWithVerticalAccelerationAndUncertainty,
    ...
}
LocationError ::= SEQUENCE {
    locationfailurecause            LocationFailureCause,
    ...
}
LocationFailureCause ::= ENUMERATED {
    undefined,
    requestedMethodNotSupported,
    positionMethodFailure,
    periodicLocationMeasurementsNotAvailable,
    ...
}
EarlyFixReport-r12 ::= ENUMERATED {
    noMoreMessages,
    moreMessagesOnTheWay
}
LocationSource-r13 ::= BIT STRING {     a-gnss          (0),
                                        wlan
    (1),
                                        bt
    (2),
                                        tbs
    (3),
                                        sensor
    (4) } (SIZE(1..16))
-- ASN1STOP
```

The proposed generalization may have multiple uses, such as e.g.:

Reporting information for multiple segments, such as velocity and/or acceleration constant over the segment, and the position given in the end of each segment. The target device 10 may split up the reporting in segments as it pleases. In the end, after all segments are over—the UTC time resolution is in seconds. In another embodiment a delta time between the reference and the current report time may be considered and reported to the network node 20. The current report time shall herein be interpreted as the time in which the displacement for the segment currently reported was determined. The delta time may e.g. be indicated by an SFN represented by an integer value.

Reporting information in bulk. The location information may be reported periodically as a set of positions, such as the positions measured in a series of previous segments.

When the location source is one of the relative ones, i.e. when the location source reports a displacement in relation to the reference point, the first item may describe the reference position and/or the reference time and the second and subsequent item(s) may describe the displacements. With both the existing Location Source Information Elements (IE) and a new one, it is also possible to encode the combination of one method to provide the reference and one to provide the relative position. An assisted GNSS (A-GNSS) may be reported in the location source.

According to one embodiment separate IEs for the time may be used, since there may be a need to have a time per segment in the list.

An alternative may be that the list only contains the positions in addition to the one already existing in this IE. The existing position may be used to encode the reference position in case a relative position is provided with the report.

As mentioned one alternative may be to have a relative time to be added instead of UTC time. The relative time is the time in relation to the reference time, which may also be referred to as the delta time.

The existing possible periodicities 1, 2, 4, 8, 16, 32, 64 seconds may be supported.

In addition to the existing periodicities, a high resolution may be required, such as for example at 100 ms. Therefore, one field referred to as relativeTime as an INTEGER (1 . . . 64), and one field referred to as relativeTimeDelta as an INTEGER (1 . . . 9) (scale factor 100 ms) may be added.

In one embodiment an IE referred to as LocationSource-r13 may be extended to include more options for the location sources or a separate indication for LocationSource-r15 may be introduced to enable the combination of the two. One example of the LocationSource-r15 IE is provided below:

```
LocationSource-r15 ::= BIT STRING {
        barometirc-sensor          (0),
        imu-accelorometer          (1),
        imu-magnetometer           (2)
        imu-gyroscope              (3),
        light-sensor               (4),
        pedestrian dead reckoning  (5),
        environment-hybrid-based   (6)}
(SIZE (1..16))
```

Additional sensor measurements:

LPP signaling for new sensor measurements according to one embodiment herein is provided below. The signaling may be provided either in a separate IE, or as an extension to the existing sensor measurement IE. The signaling in ASN1 may for example be according to:

```
-- ASN1START
AdditionalSensors-ProvideLocationInformation-r15 ::= SEQUENCE {
    additionalSensors-MeasurementInformation-r15 AdditionalSensors-
MeasurementInformation-r15           OPTIONAL,
    ...
}
-- ASN1STOP
-- ASN1START
AdditionalSensors-MeasurementInformation ::= SEQUENCE {
    measurementReferenceTime-r15           UTC Time
OPTIONAL,
    gyroscope-r15                          Gyroscope-r15
OPTIONAL,
    magnetometer-r15                       Magnetometer-r15
OPTIONAL,
    accelerometer-r15                      Accelerometer-r15
OPTIONAL,
    lightSensor-r15                        LightSensor-r15
OPTIONAL,
    indoorOutdoorInfo-r15                  IndoorOutdoorInfo-r15
OPTIONAL,
    ...
}
```

```
-continued

Gyroscope-r15 ::= SEQUENCE {
    averageX-r15        INTEGER(TBD)    OPTIONAL,
    averageY-r15        INTEGER(TBD)    OPTIONAL,
    averageZ-r15        INTEGER(TBD)    OPTIONAL,
    varianceX-r15            INTEGER(TBD)    OPTIONAL,
    varianceY-r15       INTEGER(TBD)    OPTIONAL,
    varianceZ-r15       INTEGER(TBD)    OPTIONAL
}
Magnetometer-r15 ::= SEQUENCE {
    averageX-r15        INTEGER(TBD)    OPTIONAL,
    averageY-r15        INTEGER(TBD)    OPTIONAL,
    averageZ-r15        INTEGER(TBD)    OPTIONAL,
    varianceX-r15            INTEGER(TBD)    OPTIONAL,
    varianceY-r15       INTEGER(TBD)    OPTIONAL,
    varianceZ-r15       INTEGER(TBD)    OPTIONAL
}
Accelerometer-r15 ::= SEQUENCE {
    averageX-r15        INTEGER(TBD)        OPTIONAL,
    averageY-r15        INTEGER(TBD)        OPTIONAL,
    averageZ-r15        INTEGER(TBD)        OPTIONAL,
    averageTot-r15           INTEGER(TBD)        OPTIONAL,
    varianceX-r15            INTEGER(TBD)        OPTIONAL,
    varianceY-r15       INTEGER(TBD)        OPTIONAL,
    varianceZ-r15       INTEGER(TBD)        OPTIONAL
    varianceTot-r15     INTEGER(TBD)        OPTIONAL
}
LightSensor-r15 ::= SEQUENCE {
    averageIntensity        INTEGER(TBD) OPTIONAL,
    varianceIntensity       INTEGER(TBD) OPTIONAL
}
indoorOutdoorInfo-r15 :: SEQUENCE {
    refToPointEnvironmentChange-r15        ENUMERATED
                                           {in-in, in-out, out-
in, out-out }        OPTIONAL,
    environmentChangeCertainty-r15         INTEGER (1..100)
OPTIONAL,
    ...
}
-- ASN1STOP
```

Additional Sensor Location Information Request

An IE, which may be referred to as AdditionalSensor-RequestLocationInformation may be added to allow the location server to request location information for additional sensor-based methods from the target device 10. The signaling in ASN1 may for example be according to:

```
-- ASN1START
AdditionalSensor-RequestLocationInformation-r15 ::= SEQUENCE {
    relativeDisplacementReq-r15           BOOLEAN,
    environmentChangeReq-r15              BOOLEAN
    ...,
}
-- ASN1STOP
    AdditionalSensor Assistance Data Elements
```

A further IE, which may be referred to as AdditionalSensor-AssistanceDataList, may be added in order to allow the location server to provide the Additional Sensor specific assistance data to the target device 10. The signaling in ASN1 may for example be according to:

```
-- ASN1START
AdditionalSensor-AssistanceDataList-r15::= SEQUENCE {
    refPosition-r15    EllipsoidPointWithAltitudeAndUncertaintyEllipsoid
OPTIONAL, -- Need ON
    ...
}
-- ASN1STOP
```

AdditionalSensor Error Elements

A further IE, which may be referred to as AdditionalSensor-Error may be added in order to allow the location server or target device 10 to provide Sensor Error Reasons to the target device 10 or location server, respectively. The signaling in ASN1 may for example be according to:

```
-- ASN1START
AdditionalSensor-Error-r15 ::= CHOICE
    locationServerErrorCauses-r15        AdditionalSensor-
LocationServerErrorCauses-r15,
    targetDeviceErrorCauses-r15          AdditionalSensor-
TargetDeviceErrorCauses-r15,
    ...
}
-- ASN1STOP
```

A further IE, which may be referred to as AdditionalSensor-LocationServerErrorCauses may be added in order to allow the location server to provide error reasons for Additional Sensor positioning to the target device 10. The signaling in ASN1 may for example be according to:

```
-- ASN1START
AdditionalSensor-LocationServerErrorCauses-r15 ::= SEQUENCE {
    cause-r15         ENUMERATED        {    undefined,
                                             ...,
    assistanceDataIotSupportedByServer,
    assistanceDataSupportedButCurrentlyNotAvailableByServer
                                             },
    ...
}
-- ASN1STOP
```

A further IE, which may be referred to as AdditionalSensor-TargetDeviceErrorCauses may be added in order to allow the target device 10 to provide error reasons for Additional Sensor positioning to the location server. The signaling in ASN1 may for example be according to:

```
-- ASN1START
AdditionalSensor-TargetDeviceErrorCauses-r15 ::= SEQUENCE {
    cause-r15         ENUMERATED        {    undefined,
                                             ...,
    assistanceDataMissing
                                             },
    ...
}
-- ASN1STOP
```

Inertial Measurement Units (IMUs) have been deployed in smartphones for some time. Data from such units may be used to support positioning and orienteering of the device together with other measurements such as GNSS, magnetometer, barometer etc. Recently, there are also interest in specifying means to configure and report of IMU measurements to a network server.

The IMU in devices, such as e.g. the target device 10, may be based on multiple axes accelerometer and gyro, which may typically have three axes each. The IMU may furthermore typically be integrated in the device such that these axes are aligned with the device geometry, such as e.g. having two axes aligned with the horizontal plane when the phone is laying flat, and one upwards.

There are obvious benefits of IMUs for UE-based positioning, where the target device 10 may fuse IMU measurements with other measurements for refined positioning. IMUs may also be used for UE assisted positioning, where the target device 10 reports IMU measurements to the network node 20. The embodiments herein relate to a method of flexible IMU reporting.

Details about time segmentation:

In the following the IMU is used as an exemplary location source, however the following embodiments also apply to the other location sources disclosed herein. It may not be practical for the network node 20 to receive all the location source measurements, such as IMU measurements, done at the UE side. On the other hand, having a fixed periodical time reporting may also not be an efficient approach, as the fixed timing may be too short or too long at different times due to UE behavior. There may be specific time segmentation for IMU reporting based on some sudden changes in the UE behavior.

In one embodiment, these time segment separations may be identified by the target device 10, such as the UE, by thresholding the measurements for each sensor or a specific sensor. Thresholding shall herein be interpreted as setting a threshold for a specific measurement for when a measurement shall be reported to the network node 20. In other words, the position measurement may be reported when a value measured with the sensor is equal to or exceeds the threshold.

In another embodiment, these time segment separations may be identified by the UE by taking the derivative of the measurement curves for each sensor. In case the absolute derivative is above a threshold in one time instant, then this point defines a divider between time segments.

In general, the identified time segmentation instants may be when one or more sensors fulfil a time segmentation criteria. The time segmentation criteria may be based on a device sensor sensitivity, where a high sensitive (accurate) device needs less change, such as e.g. a lower absolute derivative, in comparison to a less sensitive device.

In another embodiment, the target device 10 may be configured with the time segmentation criteria. The criteria may be a sensor specific threshold described above or some predefined more complex criteria. The time segments may also be subject to a maximum/minimum time duration of time segments.

It is common to observe changes in one or more sensors but not in all of them. In one embodiment, the target device 10 may be configured to refrain from reporting data for a sensor if the data is the same as in the previous time segment. Optionally, the target device 10 may indicate that it has refrained from reporting due to the data being the same as in the previous time segment.

In case of noisy IMU measurements, for example when a triggering criteria is fulfilled constantly during a short time period, the time segments may be too short which indicates that no reliable IMU data may be gathered from that time period. The target device 10 may then report a combined time segment comprising the time duration when the IMU is too noisy, and for that time segment indicate that no reliable IMU data may be gathered. In one embodiment, the target device 10 may also report statistical properties of the IMU data in that time segment. This may for example be the distribution of the sensor magnitudes, such as for example the distribution of the gyroscope yaw-magnitudes within said time segment. Other statistical means may comprise:

a max value of the time segment,
    an amount of time, or a fraction of the time segment, which the sensor data has been exceeding a threshold.
    frequency domain information about the time segment, such as information obtained via a transformation from time to frequency domain, e.g. via a Fourier transform.

Energy in in the frequency spectrum may indicate the vibration that the device has been subject to during the time segment.

Details regarding IMU data per time segment:

The IMU data for each time segment may be an averaged value of the considered IMU or may be a filtered value, which may be obtained for example by first applying a low-pass filter to get rid of high noise peaks, and then applying averaging of the filtered values.

In one embodiment, the target device 10, such as the UE, may report the new IMU data based on a difference, which may also be referred to as a relative value, from the previous value reported, or in another embodiment, at any time instant that reporting is triggered the corresponding IMU sensor data value may be reported.

Reference position information:

The location source measurements, which may also be referred to as sensor measurements, such as e.g. IMU measurements, magnetometer measurements, light sensor measurements, and/or barometer measurements provide relative position information, which need an absolute reference position to relate to in order to enable a determination and/or estimation of the absolute position at the location server or at the target device 10.

In one embodiment, the network node 20 and/or LS may send an absolute reference position to the target device 10.

In another embodiment, the network node 20 and/or LS may send absolute reference position information in terms of a time instant, and the target device 10 may determine the relative position to its position at this time instant. The time instant may be explicit or implicit, such as the time of the most recent positioning report from the target device 10.

In one embodiment, the target device 10 may determine the reference position. In one embodiment the reference position may be an estimated absolute position at a previous time instant. In another embodiment, the reference position determined by the target device 10 may be an artificial position used to encode a relative position by stating another absolute position, where the difference between the two gives the relative position. The reference position used may be indicated in the report of the determined displacement sent from the target device 10 to the network node 20 in order to indicate the reference position that the displacement has been determined in relation to. The reference position may be indicated by sending the absolute position used as a reference and/or by providing an indication of a time at which the reference position was obtained, which may also be referred to as the reference time. The indication of the time at which the reference position was obtained may e.g. be a time stamp of the actual time or a time stamp of a determined displacement in combination with a delta time stamp between the time stamp of a determined displacement and the time at which the reference position was obtained.

Figure 5A:
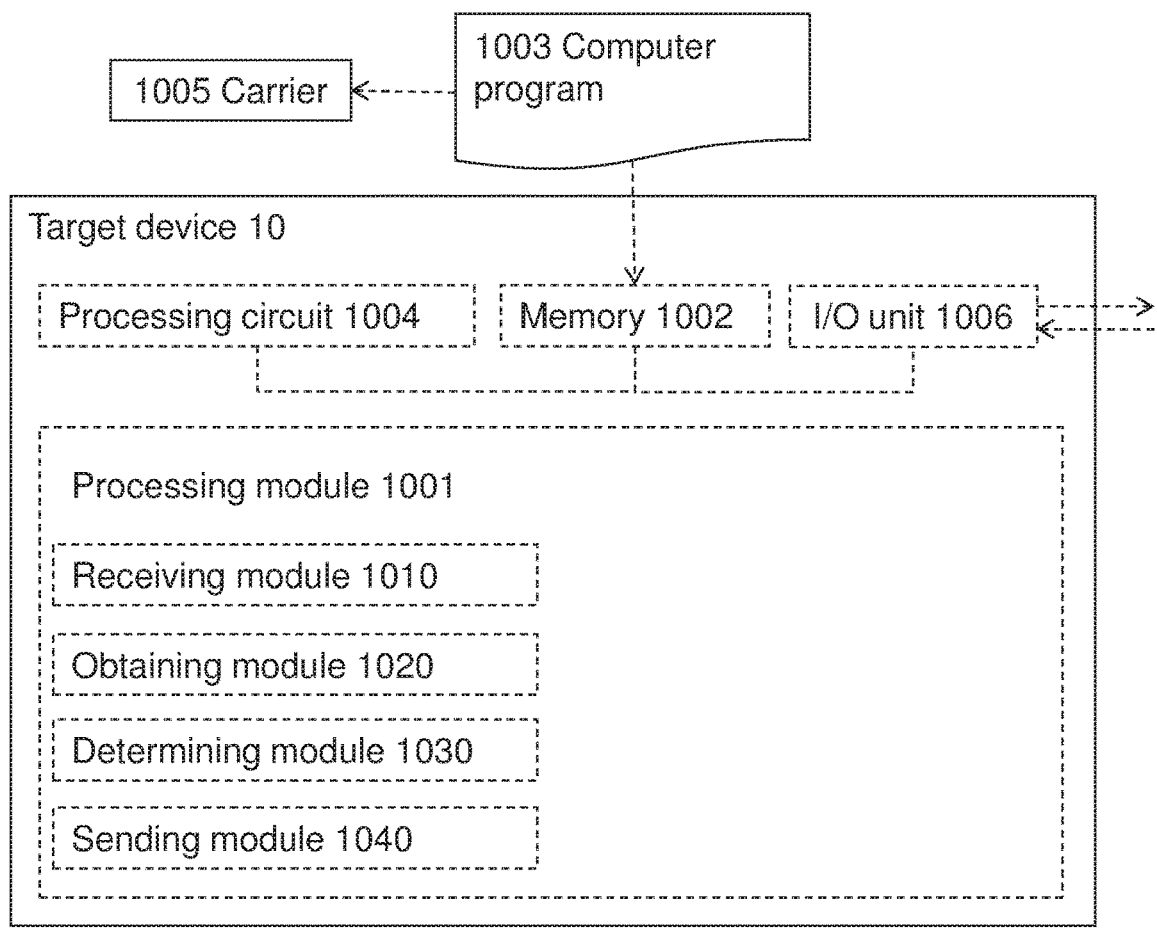
FIG. 5a is a schematic block diagram illustrating some first embodiments of a target device.

With reference to FIG. 5a, a schematic block diagram of embodiments of the target device 10 of FIG. 1 is shown.

The target device 10 may comprise a processing module 1001, such as a means for performing the methods described herein. The means may be embodied in the form of one or more hardware modules and/or one or more software modules The target device 10 may further comprise a memory 1002. The memory may comprise, such as contain or store, instructions, e.g. in the form of a computer program 1003, which may comprise computer readable code units.

According to some embodiments herein, the target device 10 and/or the processing module 1001 comprises a processing circuit 1004 as an exemplifying hardware module.

Accordingly, the processing module 1001 may be embodied in the form of, or 'realized by', the processing circuit 1004. The instructions may be executable by the processing circuit 1004, whereby the target device 10 may be operative to perform the methods of FIG. 3. As another example, the instructions, when executed by the target device 10 and/or the processing circuit 1004, may cause the target device 10 to perform the method according to FIG. 3 and related to the target device 10.

In view of the above, there is provided a target device 10 for performing a method for positioning the target device 10. As mentioned, the target device 10 may be configured to perform the method steps disclosed in FIG. 3.

Again, the memory 1002 may contain the instructions executable by said processing circuit 1004 whereby the target device 10 may be operative for:

determining a displacement of the target device 10 from a reference position based measurements performed by at least one location source, sending, to a network node 20, a report of the determined displacement of the target device 10.

The memory 1002 may contain the instructions executable by said processing circuit 1004 whereby the target device 10 may further be operative for:

sending, to the network node 20, capability information about supported displacement reporting, and/or obtaining, from the network node 20, a request for displacement reporting.

FIG. 5a further illustrates a carrier 1005, or program carrier, which comprises the computer program 1003 as described directly above.

In some embodiments, the processing module 1001 may comprise an Input/Output module 1006, which may be exemplified by a receiving module and/or a sending module as described below when applicable.

In further embodiments, the target device 10 and/or the processing module 1001 may comprise one or more of a receiving module 1010, an obtaining module 1020, a determining module 1030, and a sending module 1040 as exemplifying hardware modules. In other examples, one or more of the aforementioned exemplifying hardware modules may be implemented as one or more software modules.

Accordingly, the target device 10 may be configured for determining a displacement of the target device 10 from, i.e. in relation to, a reference position based on measurements performed by at least one location source.

Therefore, according to the various embodiments described above, the target device 10 and/or the processing module 1001 and/or the determining module 1030 may be configured for determining a displacement of the target device 10 in relation a reference position based on measurements performed by at least one location source.

Accordingly, the target device 10 may be configured for determining one or more displacements of the target device 10 in relation to a reference position based on measurements performed by at least one location source.

Therefore, according to the various embodiments described above, the target device 10 and/or the processing module 1001 and/or the determining module 1030 may be configured for determining one or more displacements of the target device 10 in relation to a reference position based on measurements performed by at least one location source.

The target device 10 may further be configured for sending, to the network node 20, the report comprising the determined one or more displacements of the target device 10 and a reference time to which the reference position is associated.

Therefore, according to the various embodiments described above, the target device 10 and/or the processing module 1001 and/or the sending module 1040 may be configured for sending the report comprising the determined one or more displacements of the target device 10 and a reference time to which the reference position is associated.

The target device 10 may further be configured for sending, to the network node 20, such as e.g. a location server or a radio access network node 20, a report of the determined displacement of the target device 10. The report of the determined displacement may comprise an indication of a reference position of the target device 10 at an initial measurement point.

Therefore, according to the various embodiments described above, the target device 10 and/or the processing module 1001 and/or the sending module 1040 may be configured for sending a report of the determined displacement of the target device 10.

The target device 10 may further be configured for sending, to the network node 20, the report further comprising the delta time stamp of a current time when each of the one or more displacements were determined in comparison to the reference time.

Therefore, according to the various embodiments described above, the target device 10 and/or the processing module 1001 and/or the sending module 1040 may be configured for sending the report to the network node 20 further comprising a delta time stamp of a current time when each of the one or more displacements were determined in comparison to the reference time.

The target device 10 may further be configured for obtaining, from the network node 20, a request for displacement reporting.

Therefore, according to the various embodiments described above, the target device 10 and/or the processing module 1001 and/or the obtaining module 1020 may be configured for obtaining, from the network node 20, a request for displacement reporting. The obtained request may comprise at least one preferred location source and/or a reference position.

The target device 10 may further be configured for sending, to the network node 20, such as e.g. the location server or a radio network node 20, capability information about supported location sources for displacement reporting.

Therefore, according to the various embodiments described above, the target device 10 and/or the processing module 1001 and/or the sending module 1040 may be configured for sending, to the network node 20, such as e.g. the location server or a radio network node 20, capability information about supported location sources for displacement reporting.

Figure 5B:
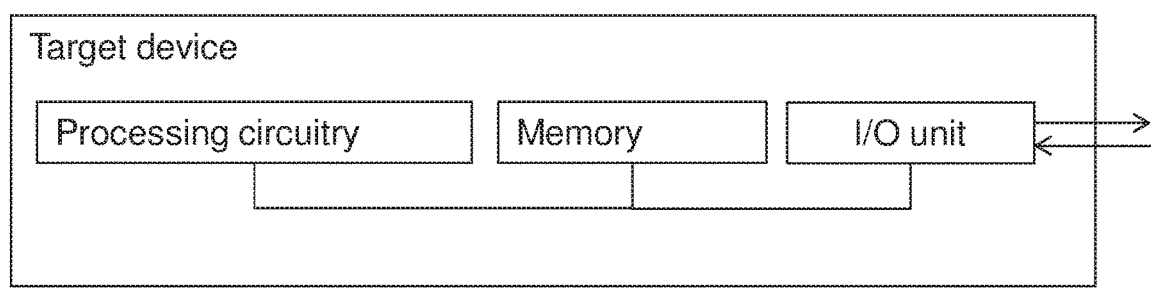
FIG. 5b is a schematic block diagram illustrating some second embodiments of a target device.

The embodiments herein may further also be implemented through a processing circuitry in the target device 10, such as the UE, as depicted in FIG. 5b, which processing circuitry is configured to perform the method actions according to FIG. 3 and the embodiments described above for the target device 10.

Figure 6A:
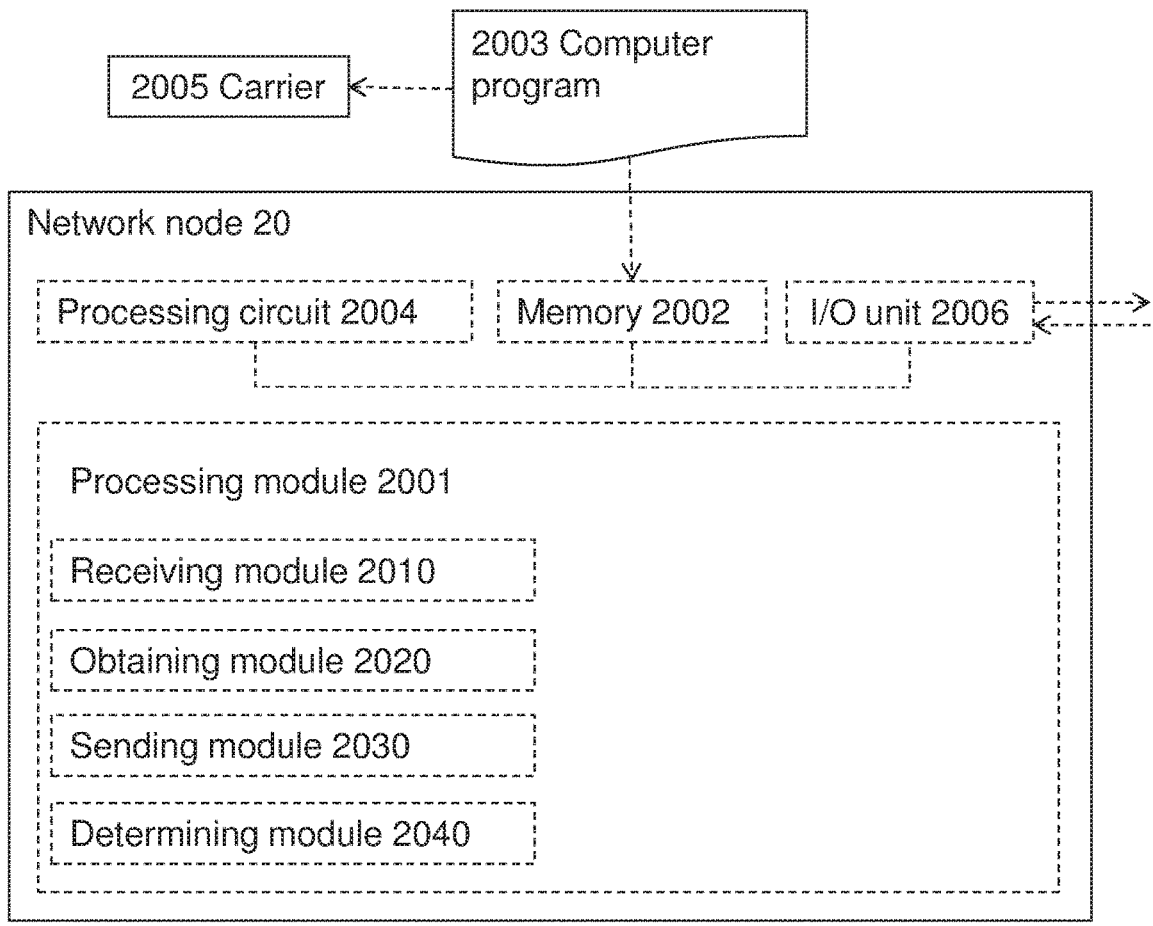
FIG. 6a is a schematic block diagram illustrating some first embodiments of a network node.

With reference to FIG. 6a, a schematic block diagram of embodiments of the network node 20 of FIG. 1 is shown.

The network node 20 may comprise a processing module 2001, such as a means for performing the methods described herein. The means may be embodied in the form of one or more hardware modules and/or one or more software modules The network node 20 may further comprise a memory 2002. The memory may comprise, such as contain or store, instructions, e.g. in the form of a computer program 2003, which may comprise computer readable code units.

According to some embodiments herein, the network node 20 and/or the processing module 2001 comprises a processing circuit 2004 as an exemplifying hardware module. Accordingly, the processing module 2001 may be embodied in the form of, or 'realized by', the processing circuit 2004. The instructions may be executable by the processing circuit 2004, whereby the network node 20 may be operative to perform the method for handling positioning of a target device 10 as disclosed in relation to FIG. 4. As another example, the instructions, when executed by the network node 20 and/or the processing circuit 2004, may cause the network node 20 to perform the method according to FIG. 4.

In view of the above, in one example, there is provided a network node 20 for performing a method for positioning the target device 10. As mentioned, the network node 20 may be configured to perform the method steps disclosed in relation to FIG. 4.

Again, the memory 2002 may contain the instructions executable by said processing circuit 2004 whereby the network node 20 may be operative for:
obtaining, from the target device 10, a report comprising one or more displacement of the target device 10 in relation to a reference position, wherein the one or more displacements have been determined based on measurements performed by at least one location source, and a reference time to which the reference position is associated,
determining an absolute position of the target device 10 based on the obtained one or more displacements and/or the reference position associated to the reference time.

The memory 2002 may further contain the instructions executable by said processing circuit 2004, whereby the network node 20 may further be operative for:
sending, to the target device 10, a request for displacement reporting, and/or
receiving, from the target device 10, capability information about supported location sources for displacement reporting.

FIG. 6 further illustrates a carrier 2005, or program carrier, which comprises the computer program 2003 as described directly above.

In some embodiments, the processing module 2001 comprises an Input/Output module 2006, which may be exemplified by a receiving module and/or a sending module as described below when applicable.

In further embodiments, the network node 20 and/or the processing module 2001 may comprise one or more of a receiving module 2010, an obtaining module 2020, a determining module 2030, and a sending module 2040 as exemplifying hardware modules. In other examples, one or more of the aforementioned exemplifying hardware modules may be implemented as one or more software modules.

Accordingly, the network node 20 is configured for obtaining, from the target device 10, a report comprising one or more displacement of the target device 10 in relation to a reference position, wherein the one or more displacements have been determined based on measurements performed by at least one location source. The network node 20 is further configured for obtaining, from the target device 10, the report comprising the reference time to which the reference position is associated.

Therefore, according to the various embodiments described above, the network node 20 and/or the processing module 2001 and/or the obtaining module 2020 may be configured for obtaining report comprising one or more displacement of the target device 10 in relation to a reference position, wherein the one or more displacements have been determined based on measurements performed by at least one location source, and the reference time to which the reference position is associated.

The network node 20 is further configured to determine an absolute position of the target device 10 based on the obtained one or more displacements and the reference position associated to the reference time.

Therefore, according to the various embodiments described above, the network node 20 and/or the processing module 2001 and/or the determining module 2030 may be configured for an absolute position of the target device 10 based on the obtained displacement and the reference position associated to the reference time.

The network node 20 may further be configured for obtaining, from the target device 10, the report from the target device 10 further comprising a delta time stamp of a current time when each of the one or more displacements were determined in comparison to the reference time.

Therefore, according to the various embodiments described above, the network node 20 and/or the processing module 2001 and/or the obtaining module 2020 may be configured for obtaining the report from the target device 10 further comprising a delta time stamp of a current time when each of the one or more displacements were determined in comparison to the reference time.

Furthermore, the network node 20 may be configured for sending, to the target device 10, a request for displacement reporting.

Therefore, according to the various embodiments described above, the network node 20 and/or the processing module 2001 and/or the sending module 2020 may be configured for sending, to the target device 10, a request for displacement reporting. The request may comprise at least one preferred location source and/or a reference position.

Furthermore, the network node 20 may be configured for receiving, from the target device 10, capability information about supported location sources for displacement reporting.

Therefore, according to the various embodiments described above, the network node 20 and/or the processing module 2001 and/or the receiving module 2010 may be configured for receiving, from the target device 10, capability information about supported location sources for displacement reporting.

Figure 6B:
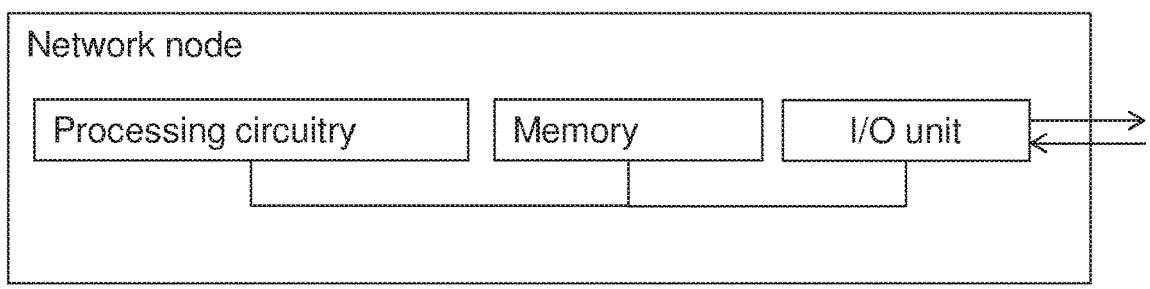
FIG. 6b is a schematic block diagram illustrating some second embodiments of a network node.

The embodiments herein may further also be implemented through a processing circuitry in the network node 20, such as the location server, as depicted in FIG. 6b, which processing circuitry is configured to perform the method actions according to FIG. 4 and the embodiments described above for the network node 20.

The methods according to the embodiments described herein for the target device 10 and the network node 20 may be respectively implemented by means of e.g. a computer program or a computer program product, comprising instructions, i.e., software code portions, which, when executed on at least one processor, cause the at least one processor to carry out the actions described herein, as performed by the target device 10 or network node 20. The computer program may be stored on a computer-readable storage medium, e.g. a disc or similar. The computer-readable storage medium, having stored thereon the computer program, may comprise the instructions which, when executed on at least one processor, cause the at least one processor to carry out the actions described herein, as performed by the target device 10 or the network node 20. In some embodiments, the computer-readable storage medium may be a non-transitory computer-readable storage medium.

Those skilled in the art will also appreciate that the Input/Output module 1006, 2006, the processing module 1001, 2001, the receiving module 1010, 2010, the obtaining module 1020, 2020, the determining module 1030, 2030, the sending module 1040, 2040, described above may refer to a combination of analog and digital circuits, and/or one or more processors configured with software and/or firmware, e.g. stored in the memory 1002, 2002, that when executed by the one or more processors such as the processing unit as described above perform actions according to any of the above actions as performed by the target device 10 or the network node 20. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

The network node 20 described in the embodiments herein may also be implemented in a cloud. Although the method actions performed by the network node 20 herein are discussed in the context of a radio access node, the method may also be performed by a core network node or a distributed node comprised in a first cloud, such as e.g. a server and/or a datacenter. The method actions may e.g. be performed by a logical function, which may be a centralized service hosted on the core network node or the distributed node.

When using the word "comprise" or "comprising" it shall be interpreted as non-limiting, i.e. meaning "consist at least of".

Further examples and embodiments may be defined as in the following paragraphs:

Embodiments herein may further relate to:

1. A target device (10), for performing a method for handling positioning of the target device (10), comprising a processor and a memory, said memory containing instructions executable by said processor wherein said target device (10) is operative to:
   determine one or more displacements of the target device (10) in relation to a reference position based on measurements performed by at least one location source,
   send, to a network node (20), a report comprising the determined one or more displacements of the target device (10), a reference time to which the reference position is associated.

2. The target device according to embodiment 1, wherein the target device further is operative to:
   send the report to the network node (20) further comprising a delta time stamp of a current time when each of the one or more displacements were determined in comparison to the reference time.

3. The target device according to paragraph 1 or 2, wherein the target device further is operative to:
   send the report further comprising information regarding the at least one location source that has been used for determining the displacement.

4. The target device (10) according to any of the paragraphs 1 to 3, wherein the target device (10) is further operative to:
   obtain, from the network node (20), a request for displacement reporting.

5. The target device (10) according to paragraph 4, wherein target device (10) is further operative to obtain the request comprising at least one preferred location source and/or a reference position to be used by the target device when determining the displacement.

6. The target device (10) according to any of the paragraphs 1 to 5, wherein the target device (10) is further operative to send, to the network node (20), capability information about supported location sources for displacement reporting.

7. The target device (10) according to any of the previous paragraphs, wherein the target device (10) is further operative to send the report of the determined displacement comprises an indication of the reference position of the target device (10) at an initial measurement point.

8. A network node (20), for performing a method for handling positioning of a target device (10), comprising a processor and a memory, said memory containing instructions executable by said processor wherein said network node (20) is operative to:
  obtain, from the target device (10), a report comprising one or more displacement of the target device (10) in relation to a reference position, wherein the one or more displacements have been determined based on measurements performed by at least one location source, and a reference time to which the reference position is associated,
  determine an absolute position of the target device (10) based on the obtained one or more displacements and the reference position associated to the reference time.

9. The network node according to paragraph 8, wherein the network node (20) is further operative to receive the report from the target device (10) further comprising a delta time stamp of a current time when each of the one or more displacements were determined in comparison to the reference time.

10. The network node according to paragraph 8 or 9, wherein the network node (20) is further operative to obtain the report further comprising an indication of the at least one location source that has been used for determining the displacement.

11. The network node (20) according to any of the paragraphs 8 to 10, wherein the network node (20) is further operative to:
  send, to the target device (10), a request for displacement reporting.

12. The network node (20) according to any of the paragraphs 8 to 11, wherein the network node (20) is further operative to send the request comprising at least one preferred location source and/or a reference position.

13. The network node (20) according to any of the paragraphs 8 to 12, wherein the network node (20) is further operative to:
  receive, from the target device (10), capability information about supported location sources for displacement reporting.

14. The network node (20) according to any of the paragraphs 8 to 13, wherein the network node (20) is further operative to obtain the report of the displacement comprising an indication of the reference position of the target device (10) at an initial measurement point.

Embodiments herein may according to a second example also relate to:

15. A target device (10), for performing a method for handling positioning of the target device (10), comprising:
  a determining module (1030) configured to determine one or more displacements of the target device (10) in relation to a reference position based on measurements performed by at least one location source,
  a sending module (1040) configured to send, to a network node (20), a report comprising the determined one or more displacements of the target device (10), a reference time to which the reference position is associated.

16. The target device (10) according to paragraph 15, wherein the target device (10) further comprises:
  the sending module (1040) further being configured to send the report to the network node (20) further comprising a delta time stamp of a current time when each of the one or more displacements were determined in comparison to the reference time 17. The target device (10) according to paragraph 15 or 16, wherein the target device (10) further comprises:
  the obtaining module (1020) configured to obtain, from the network node (20), a request for displacement reporting.

18. The target device (10) according to paragraph 17, wherein the target device (10) further comprises:
  the obtaining module (1020) configured to obtain the request comprising at least one preferred location source and/or a reference position to be used by the target device when determining the displacement.

19. The target device (10) according to any of the paragraphs 15 to 18, wherein the target device (10) further comprises:
  the sending module (1040) configured to send, to the network node (20), capability information about supported location sources for displacement reporting.

20. A network node (20), for performing a method for determining a positioning of a target device (10), comprising:
  obtain, from the target device (10), a report comprising one or more displacement of the target device (10) in relation to a reference position, wherein the one or more displacements have been determined based on measurements performed by at least one location source, and a reference time to which the reference position is associated,
  determine an absolute position of the target device (10) based on the obtained one or more displacements and the reference position associated to the reference time.

21. The network node according to paragraph 20, further comprising:
  the obtaining module (2020) configured to obtain the report from the target device (10) further comprising a delta time stamp of a current time when each of the one or more displacements were determined in comparison to the reference time.

22. The network node according to paragraph 20 or 21, further comprising:
  the obtaining module (2020) configured to obtain the report further comprising an indication of the at least one location source that has been used for determining the one or more displacements.

23. The network node (20) according to any of the paragraphs 20 to 22, further comprising:
  the sending module (2030) further configured to send, to the target device (10), a request for displacement reporting.

24. The network node (20) according to paragraph 23, further comprising:
  the sending module (2030) further configured to send the request comprising at least one preferred location source and/or a reference position.

25. The network node (20) according to any of the paragraphs 20 to 24, further comprising:

a receiving module (2010) configured to receive, from the target device (10), capability information about supported location sources for displacement reporting.

What is claimed is:

1. A method performed by a target device for positioning of the target device, wherein the method comprises:
   receiving signaling from a network node of a communication network, the signaling indicating a set of sensors of the target device to be used for estimating a displacement of the target device relative to a reference position;
   estimating the displacement based on measurements obtained from the set of sensors; and
   sending a report indicating a reference time associated with the reference position, the displacement, and a delta time stamp that is relative to the reference time and associated with a time segment corresponding to the measurements.

2. The method of claim 1, wherein the set of sensors excludes one or more sensors among a plurality of sensors included in the target device, such that the measurements do not include measurements from the excluded one or more sensors, the plurality of sensors being of different sensor types.

3. The method of claim 1, wherein the set of sensors comprises at least two sensors of respective sensor types, and wherein estimating the displacement based on the measurements obtained from the set of sensors comprises fusing respective measurements from the at least two sensors.

4. The method of claim 1, further comprising indicating in the report the set of sensors.

5. The method of claim 1, further comprising sending the report in response to receiving a request for displacement reporting from the network node.

6. The method of claim 5, further comprising sending capability information to the network, indicating types of sensors available in the target device for determining displacements of the target device.

7. The method of claim 1, wherein the target device has a plurality of sensors for use in determining displacements of the target device, the plurality of sensors comprising at least an Inertial Measurement Unit (IMU) sensor and one or more environmental sensors, and wherein the set of sensors comprises at least the IMU sensor.

8. The method of claim 7, wherein the set of sensors further comprises at least one of the one or more environmental sensors, and wherein the method includes the target device fusing respective measurements from the IMU sensor and the at least one of the environmental sensors, as the measurements obtained from the set of sensors.

9. The method of claim 1, wherein determining the displacement of the target device relative to the reference position comprises determining displacements at times over successive time segments, based on respective measurements, and determining divisions of the successive time segments dynamically, based on observed changes in the respective measurements.

10. A target device configured for positioning of the target device, the target device comprising:
    transceiver circuitry configured for communicating with a network node; and
    processing circuitry operatively associated with the transceiver circuitry and configured to:
       receive signaling from a network node of a communication network, the signaling indicating a set of sensors of the target device to be used for estimating a displacement of the target device relative to a reference position;
       estimate the displacement based on measurements obtained from the set of sensors; and
       send a report indicating a reference time associated with the reference position, the displacement, and a delta time stamp that is relative to the reference time and associated with a time segment corresponding to the measurements.

11. The target device of claim 10, wherein the set of sensors excludes one or more sensors among a plurality of sensors included in the target device, such that the measurements do not include measurements from the excluded one or more sensors, the plurality of sensors being of different sensor types.

12. The target device of claim 10, wherein the set of sensors comprises at least two sensors of respective sensor types, and wherein, to estimate the displacement based on the measurements obtained from the set of sensors, the processing circuitry is configured to fuse respective measurements from the at least two sensors.

13. The target device of claim 10, wherein the processing circuitry is configured to indicate the set of sensors in the report.

14. The target device of claim 10, wherein the processing circuitry is configured to send the report in response to receiving a request for displacement reporting from the network node.

15. The target device of claim 14, wherein the processing circuitry is configured to send capability information to the network, indicating types of sensors available in the target device for determining displacements of the target device.

16. The target device of claim 10, wherein the target device has a plurality of sensors for use in determining displacements of the target device, the plurality of sensors comprising at least an Inertial Measurement Unit (IMU) sensor and one or more environmental sensors, and wherein the set of sensors comprises at least the IMU sensor.

17. The target device of claim 16, wherein the set of sensors further comprises at least one of the one or more environmental sensors, and wherein the method includes the target device fusing respective measurements from the IMU sensor and the at least one of the environmental sensors, as the measurements obtained from the set of sensors.

18. The target device of claim 10, wherein the processing circuitry is configured to determine the displacement of the target device relative to the reference position by determining displacements at times over successive time segments, based on respective measurements, and determining divisions of the successive time segments dynamically, based on observed changes in the respective measurements.

* * * * *